United States Patent [19]

Kawano

[11] Patent Number: 4,740,133
[45] Date of Patent: Apr. 26, 1988

[54] COMPOSITE WORKING DEVICE USING A ROBOT AND METHOD OF ACCOMPLISHING COMPOSITE WORK USING A ROBOT

[75] Inventor: Saige Kawano, Hiroshima, Japan
[73] Assignee: Mazda Motor Corporation, Japan
[21] Appl. No.: 674,788
[22] Filed: Nov. 26, 1984

[30] Foreign Application Priority Data

Nov. 24, 1983 [JP] Japan .................................. 58-221669
Nov. 24, 1983 [JP] Japan .................................. 58-221670
Nov. 26, 1983 [JP] Japan .................................. 58-222591

[51] Int. Cl.$^4$ ........................ B25J 9/00; B23K 37/00
[52] U.S. Cl. ..................................... 414/730; 228/45; 228/176; 414/912; 414/744 A; 414/786; 901/7; 901/8; 901/41; 901/42
[58] Field of Search .................... 901/30, 31, 41-43, 901/50; 108/51.1; 414/744 A, 730, 753, 607, 912, 608, 786, 785; 269/309; 198/465.1, 465.4; 228/45, 176; 29/429-430, 783-786, 791-794

[56] References Cited

U.S. PATENT DOCUMENTS

| | | | |
|---|---|---|---|
| 3,306,471 | 2/1967 | Devol | 414/744 A X |
| 3,433,370 | 3/1969 | Eisert et al. | 414/912 X |
| 3,525,382 | 8/1970 | Devol | 901/43 X |
| 3,556,315 | 1/1971 | Berger | 414/753 X |
| 3,854,889 | 12/1974 | Lemelson | 198/465.1 |
| 3,913,820 | 10/1975 | Valentine | 901/42 X |
| 4,046,263 | 9/1977 | Cwycyshyn et al. | 414/744 R |
| 4,084,684 | 4/1978 | Skinner, II | 198/465.4 |
| 4,098,088 | 7/1978 | Mason | 901/41 X |
| 4,378,959 | 4/1983 | Susnjara | 901/43 X |
| 4,480,170 | 10/1984 | Kondou et al. | 901/42 X |
| 4,611,749 | 9/1986 | Kawano | 228/45 X |

FOREIGN PATENT DOCUMENTS 8110875 3/1973 Japan .
4937386 8/1974 Japan .
58-151972 1/1983 Japan .

Primary Examiner—Robert J. Spar
Assistant Examiner—P. McCoy Smith
Attorney, Agent, or Firm—Gerald J. Ferguson, Jr.; Michael P. Hoffman; Michael J. Foycik, Jr.

[57] ABSTRACT

A welding robot is provided with a first joint member in addition to a welding gun. A work holder provided with a second joint member adapted to be connected with the first joint member and a clamp mechanism for gripping a workpiece is positioned in a predetermined waiting position. The welding robot accomplishes welding on a workpiece transferred to a first station and when the welding is completed, the welding robot approaches the work holder in the waiting position to connect the first and second joint members with each other. Then the robot returns to the first station carrying the work holder and permits the clamp mechanism of the work holder to grip the workpiece at the first station. Thereafter, the robot moves to a second station to transfer the workpiece from the first station to the second station. Then, the clamp mechanism releases the workpiece and the robot moves away from the second station to the waiting position with the workpiece left at the second station. In the waiting position the first and second joint members are disconnected from each other and the robot returns to the first station with the work holder left in the waiting position.

14 Claims, 3 Drawing Sheets

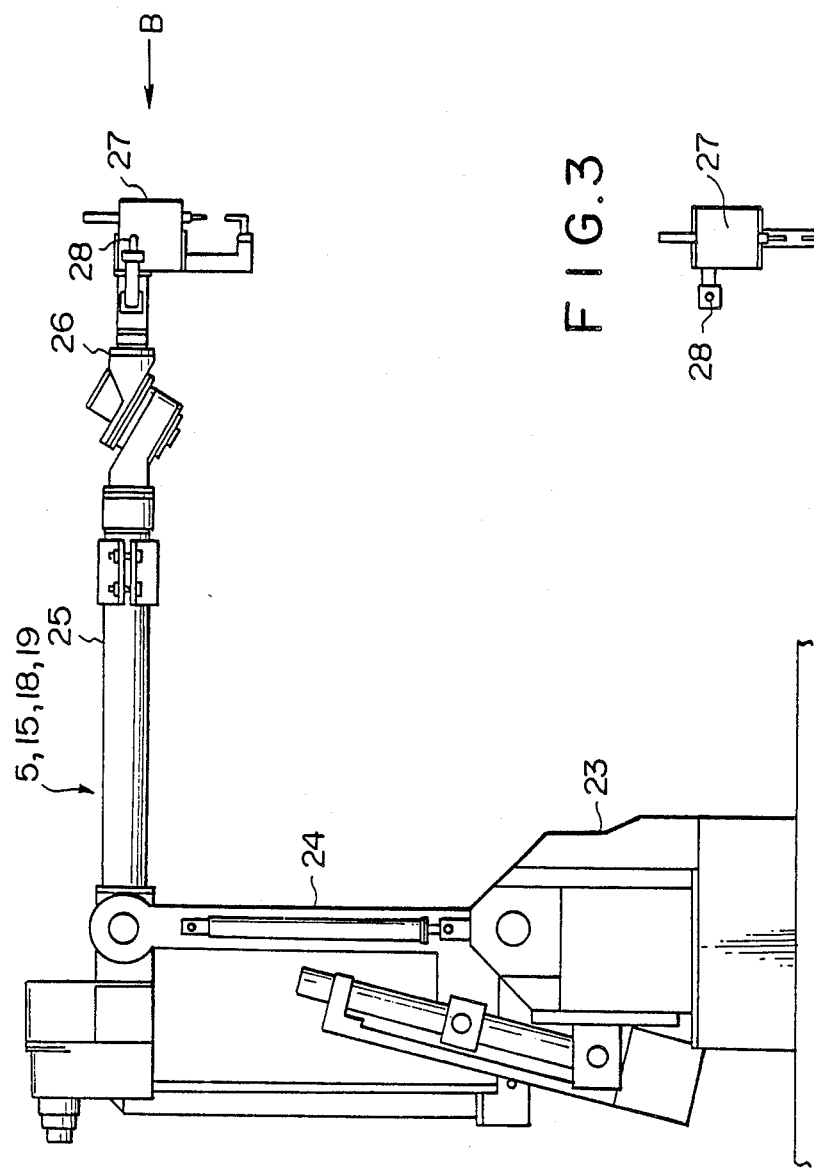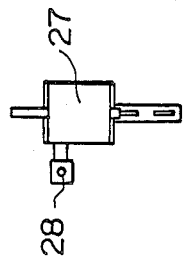

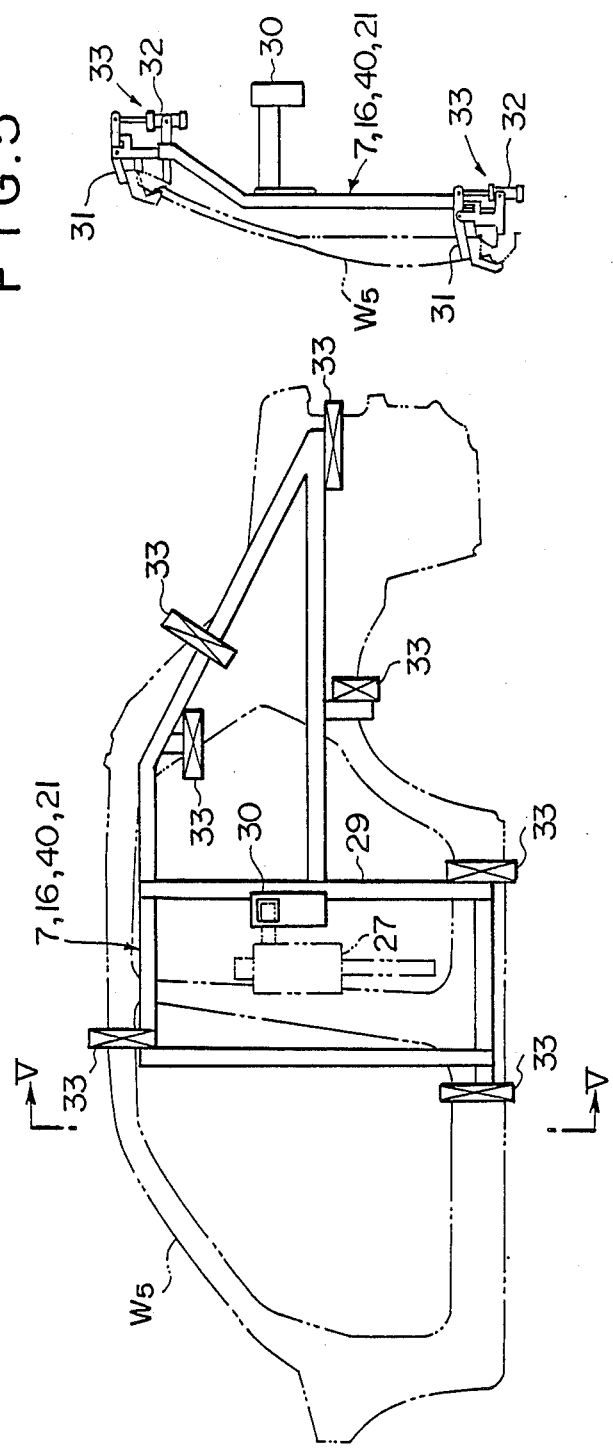

COMPOSITE WORKING DEVICE USING A ROBOT AND METHOD OF ACCOMPLISHING COMPOSITE WORK USING A ROBOT

BACKGROUND OF THE INVENTION

1. Field of the Invention

This invention relates to a composite working device using a robot, and more particularly to a composite working device in which a robot for use in assembly of vehicle bodies, for instance, is arranged to accomplish transfer of a workpiece in addition to a regular operation such as welding of the workpiece.

2. Description of the Prior Art

Recently, various robots are used, for instance in assembly of vehicle bodies in order to automate production, thereby contributing to labor saving. However, conventional robots are designed to accomplish one operation exclusively. For example, a welding robot exclusively accomplishes welding and a transfer robot exclusively accomplishes transfer of workpieces. Therefore, many robots and a large space have been required for each manufacturing step, thereby adding to the plant investment.

This applicant previously proposed arranging a robot to accomplish both welding and transfer of workpieces. (See Japanese Unexamined Patent Publication No. 58(1983)-151972). In the proposal, the robot is provided with a welding gun and the welding gun is used for gripping a workpiece when transferring the workpiece. However, this arrangement has been found to be disadvantageous in that, because the robot is arranged to grip the workpiece with the electrode of the welding gun which is thin and small, it is not suitable for transferring a large workpiece and the electrode is apt to be damaged.

SUMMARY OF THE INVENTION

In view of the foregoing observations and description, the primary object of the present invention is to provide a composite working device using a robot in which the robot can accomplish both a regular operation on a workpiece, e.g. welding, and transfer of the workpiece without danger of damaging the tool for the regular operation, e.g. a welding gun.

Another object of the present invention is to provide a composite working device using a robot in which the robot can accomplish both a regular operation on a workpiece and transfer of the workpiece without limitation on the size of the workpiece.

Still another object of the present invention is to reduce the number of robots required for a given manufacturing step.

Still another object of the present invention is to provide an improved method of accomplishing composite work using a robot in which the robot can accomplish both its regular operation such as welding on a workpiece, and transfer of the workpiece without danger of damaging the tool for the regular operation, e.g. welding gun, irrespective of the size and shape of the workpiece.

Still another object of the present invention is to provide an improved method of accomplishing composite work using a robot which can reduce the number of robots required for a given manufacturing step.

In accordance with one aspect of the present invention, there is provided a composite working device comprising a robot having an arm, a working tool for accomplishing a regular operation of the robot provided on an end portion of the arm and a first joint member provided on the arm outside the working space of the working tool, a work holder which is provided with a second joint member adapted to be connected with the first joint member and a clamp mechanism for gripping a workpiece and is adapted to be positioned in a predetermined waiting position outside the working area of said robot in the regular operation while the robot accomplishes the regular operation, and a control means for generating a regular operation command to cause the robot to accomplish the regular operation and a transfer command which causes the robot to move to the waiting position and causes the robot and the work holder to connect the first and second joint members with each other, to grip the workpiece by way of the clamp mechanism and to transfer the workpiece from a first station to a second station.

For example, the robot accomplishes welding as the regular operation. The robot may first accomplish the regular operation at the first station and may transfer the workpiece on which the regular operation has been accomplished from the first station to the second station. Otherwise the robot may first transfer a workpiece from the first station to the second station, and then may accomplish the regular operation on the workpiece at the second station. In a preferred embodiment of the present invention, said waiting position is disposed between the first station and the second station along the transfer path of the robot so that the work holder can be attached to and removed from the robot without substantially extending the cycle time of the operation of the robot.

In accordance with another aspect of the present invention, there is provided a method of accomplishing composite work using a robot comprising a step of causing the robot to accomplish a regular operation on a workpiece by use of a working tool mounted on the robot, and a step of causing the robot to accomplish transfer of the workpiece from a first station to a second station by causing the robot to connect a work holder thereto by way of a first joint member provided on the robot and a second joint member provided on the work holder and to approach the workpiece together with the work holder, actuating a clamp mechanism of the work holder to grip the workpiece, and moving the robot from the first station to the second station together with the workpiece gripped by the clamp mechanism, the step of causing the robot to accomplish transfer of the workpiece being carried out in the intervals between operations of the step of causing the robot to accomplish the regular operation, the latter step being carried out at the first or second station.

BRIEF DESCRIPTION OF THE DRAWINGS

FIG. 2 is a schematic side view of a pivoted welding robot employed in the composite working device for accomplishing both welding and transfer of a workpiece, FIG. 3 is a fragmentary end view of the robot as viewed in the direction the arrow B in FIG. 2, FIG. 4 is a schematic view for illustrating the work holder employed in the composite working device shown in FIG. 1, and FIG. 5 is a side view taken along the line V—V in FIG. 4.

DESCRIPTION OF THE PREFERRED EMBODIMENT

Figure 1:
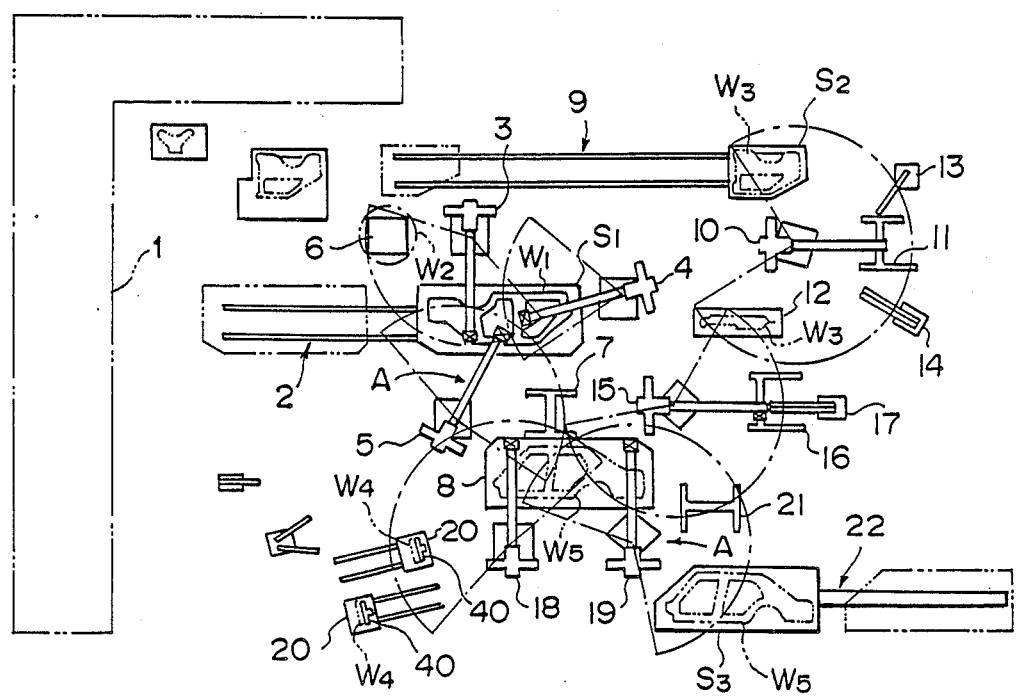
FIG. 1 is a schematic plan view of a facility for assembling and welding a side portion of a vehicle body employing a composite working device in accordance with an embodiment of the present invention.

FIG. 1 schematically shows a facility for assembling and welding the side portion of a vehicle body employing a composite working device in accordance with an embodiment of the present invention. The facility comprises a parts receiving section 1 for receiving various parts or members, a first take-in chute 2 for transferring a tack-welded outer panel W1 from the parts receiving section 1 to a predetermined welding station S1, and first to third pivoted welding robots 3, 4 and 5 disposed around the welding station S1 to accomplish welding on the tack-welded outer panel W1 transferred to the welding station S1 by way of the first take-in chute 2. The first pivoted welding robot 3 is arranged to accomplish welding on another part W2 on a welding table 6 during intervals between the welding operations on the outer panel W1 at the welding station S1. The third pivoted welding robot 5 is arranged to grip the outer panel W1 by way of a work holder 7 and transfer the outer panel W1 from the welding station S1 to an assembly table 8 after completion of the welding thereon. Unlike the other two pivoted robots 3 and 5, the second pivoted robot 4 is arranged to solely accomplish welding on the outer panel W1 at the welding station S1. Thus the tack-welded outer panel W1 transferred to the welding station S1 by way of the first take-in chute 2 is subjected to permanent welding at the welding station by the pivoted welding robots 3 to 5 and then transferred to the assembly table 8 by the third pivoted welding robot 5.

The facility further comprises a second take-in chute 9 for transferring a quarter inner panel W3 in a tack-welded state from the parts receiving section 1 to a predetermined waiting station S2, and a transfer robot 10 having a work holder 11. The transfer robot 10 is arranged to hold the quarter inner panel W3 transferred to the waiting station S2 by way of the work holder 11 and transfer it from the waiting station S2 to a temporary placing table 12. First and second stationary welding machines 13 and 14 are disposed opposite to the transfer robot 10. The stationary welding machines 13 and 14 accomplish permanent welding on one side of the quarter inner panel W3 while the quarter inner panel W3 is transferred from the waiting station S2 to the temporary placing table 12 by the transfer robot 10.

A fourth pivoted welding robot 15 is disposed between the assembly table 8 and the temporary placing table 12. The welding robot 15 is arranged to accomplish welding and assembly of the outer panel W1, the quarter inner panel W3 and a front pillar inner W4 on the assembly table 8 as will be described in more detail later, and at the same time, to hold the quarter inner panel W3 on the temporary placing table 12 by way of a work holder 16 and transfer it to the assembly table 8 during the intervals between the operations on the assembly table 8. Opposed to the fourth pivoted welding robot 15 is disposed a third stationary welding machine 17 which accomplishes permanent welding on the other side of the quarter inner panel W3 (the side opposite to the side on which the first and second welding machines 13 and 14 accomplish welding) while the quarter inner panel W3 is transferred from the temporary placing table 12 to the assembly table 8. Thus the quarter inner panel W3 transferred to the waiting station S2 by way of the second take-in chute 9 is further transferred to the assembly table 8 via the temporary placing table 12 by way of the transfer robot 10 and the fourth pivoted welding robot 15 and on the way to the assembly table 8, is subjected to permanent welding by the welding machines 13, 14 and 17.

Near the assembly table 8 are disposed fifth and sixth pivoted welding robots 18 and 19 which are arranged to cooperate with the fourth pivoted welding robot 15 in welding and assembling workpieces on the assembly table 8. The fifth pivoted welding robot 18 is arranged to transfer the front pillar inner W4, which has been placed on a placing table 20 and clamped thereto by a work holder 40, to the assembly table 8 together with the work holder 40 in the intervals between the operations on the assembly table 8. The sixth pivoted welding robot 19 is arranged to hold, by way of a work holder 21, the work-assembly W5 assembled on the assembly table 8 and transfer it from the assembly table 8 to a take-out station S3 of a take-out chute 22 after completion of welding and assembly on the assembly table 8. That is, on the assembly table 8, the outer panel W1, the quarter inner panel W3 and the front pillar inner W4 separately transferred to the assembly table 8 are welded together by the welding robots 15, 18 and 19 to be assembled into the work-assembly W5 which is of a predetermined shape and forms a side portion of the vehicle body. Then the work-assembly W5 is placed on the take-out chute 22 at the take-out station S3 by the sixth pivoted welding robot 19 to be transferred to the next manufacturing stage. The first take-in chute 2, the second take-in chute 9, the assembly table 8 and the take-out chute 22, which also function as tables for holding workpieces, are arranged in parallel to each other spaced from each other in one direction (in the vertical direction as seen in FIG. 1) by a predetermined distance, and the temporary placing table 12 is positioned spaced from the first take-in chute 2 in the transferring direction thereof, or is positioned intermediately between the second take-in chute 9 and the assembly table 8.

The pivoted welding robots 5, 15, 18 and 19 which accomplish transfer of workpieces, i.e. the outer panel W1, the quarter inner panel W3, the front pillar inner W4 and the work-assembly W5, each comprise a rotatable base pedestal 23, a supporting post 24 mounted on the pedestal 23 for pivotal movement, and a horizontal arm 25 mounted on the top of the supporting post 24 for rotation about its own central axis and for vertical pivotal movement, as shown in FIG. 2. On the free end portion of the horizontal arm 25 is mounted a welding gun 27 by way of a connecting member 26. A first joint member 28 in the form of a hook member is mounted on the connecting member 26 at a position outside the working space of the welding gun 27 so that the first joint member 28 and the welding gun 27 do not interfere with each other. See FIG. 3 too. The welding gun 27 and the first joint member 28 are movable back and forth, in response to pivotal movement of the base pedestal 23, between two tables for placing thereon a workpiece, that is, the welding station S1 of the first take-in chute 2 and the assembly table 8 in the case of the welding robot 5 which transfers the outer panel W1, the temporary placing table 12 and the assembly table 8 in the case of the welding robot 15 which transfers the quarter inner panel W3, the placing table 20 and the assembly table 8 in the case of the welding robot 18 which transfers the front pillar inner W4, and the assembly table 8 and the take-out station S3 of the take-out chute 22 in the case of the welding robot 19 which transfers the work-assembly W5.

The work holders 7, 16, 40 and 21 of the welding robots 5, 15, 18 and 19 respectively (these robots for both welding and transfer will sometimes be referred to as "welding-transferring robots", hereinbelow, in order to clearly distinguish them from those exclusively for welding) which are used when transferring the respective workpieces are positioned, while the welding-transferring robots are accomplishing their regular operation, i.e. welding, in a predetermined waiting position outside the working space of the welding-transferring robots in the regular operation and within the moving area of the welding-transferring robots (the welding gun 27 or the first joint member 28 on the free end portion of the horizontal arm 25) between said two tables for placing thereon the workpiece. Each work holder has a frame 29 assembled according to the shape of the workpiece to be transferred as shown in FIGS. 4 and 5. On the frame 29 is mounted a chuck mechanism or a second joint member 30 which is adapted to be connected with the first joint member 28 of the associated welding-transferring robot 5, 15, 18 or 19. Further, on the frame 29 are mounted a plurality of clamp mechanisms 33 which comprise a pivoted member 31 and a working cylinder 32 and are adapted to hold respective predetermined portions of the workpiece to be transferred. When one of the welding-transferring robots 5, 15, 18 and 19 transfers a workpiece, the associated work holder 7, 16, 40 or 21 is attached to the robot by way of the first joint member 28 and the second joint member 30 and holds the workpiece by way of the clamp mechanisms 33. The second joint member 30 is mounted on the frame 29 substantially at the center of gravity of the entire system including the associated work holder (7, 16, 40 or 21) and the workpiece (W1, W3, W4 and W5) held by the holder.

Each welding-transferring robot (5, 15, 18 and 19) selectively accomplishes welding and transfer according to commands (welding command or transfer command) from control means (not shown) such as of a microcomputer. The combination of the welding-transferring robot 5 and the work holder 7, and the combination of the welding-transferring robot 19 and the work holder 21 respectively form a pair of composite working devices in accordance with respective embodiments of the present invention as indicated at A in FIG. 1.

The pivoted welding robots 3 and 4 exclusively for welding are substantially the same as the welding-transferring robots 5, 15, 18 and 19 except that the former are provided only with the welding gun and not provided with the joint member, though this is not shown in detail in the drawings.

Now the operation of the composite working device A which acts on or accomplishes welding and transfer of the outer panel W1 will be described in detail by way of example.

Now, it is assumed that a tack-welded outer panel W1 has been transferred to the welding station S1 by the first take-in chute 2. At this time, the welding-transferring robot 5 is waiting at the welding station S1 with the work holder 7 not being attached to the robot 5 but being positioned in said predetermined waiting position outside the working space of the robot 5 in welding operation and between the welding station S1 and the assembly table 8. Said control means delivers a regular operation command (welding command in this particular embodiment) to the welding-transferring robot 5 and the welding gun 27 on the arm 25 of the same and the welding transferring robot 5 accomplishes permanent welding of the outer panel W1 under the control of the control means cooperating with the welding robots 3 and 4. Because the work holder 7 is positioned in the waiting position outside the working space of the robot 5 in welding operation while the robot 5 accomplishes welding operation and at the same time the first joint member 28 for attaching the work holder 7 to the robot 5 is located outside the working space of the welding gun 27, neither the work holder 7 nor the first joint member 28 can interfere with the welding operation of the robot 5 and the welding gun 27.

When the welding on the outer panel W1 at the welding station S1 is completed, the control means generates a work transfer command. When the welding-transferring robot 5 receives the transfer command, the robot 5 moves, by way of pivotal movement of the rotatable base pedestal 23, to the work holder 7 in the predetermined waiting position between the welding station S1 and the assembly table 8, and then the first joint member 28 is connected to the second joint member 30 of the work holder 7, thereby attaching the work holder 7 to the robot 5. Then the robot 5 returns to the welding station S1 toward the outer panel W1 the welding on which has been just completed, carrying the work holder 7 therewith. Then the clamp mechanisms 33 of the work holder 7 are actuated to hold the outer panel W1 and the robot 5 moves to the assembly table 8 to place the outer panel W1 thereon.

After placing the outer panel W1 on the assembly table 8, the welding-transferring robot 5 returns the work holder 7 to said waiting position between the assembly table 8 and the first take-in chute 2 and then returns to said welding station S1 to complete one cycle of operation. The welding-transferring robot 5 repeats the cycle described above.

The welding-transferring robot 19, which welds together the outer panel W1, the quarter inner panel W3 and the front pillar inner W4 into the work-assembly W5 cooperating with the robots 15 and 18 and transfers the heavy and large work-assembly W5 from the assembly table 8 to the take-out station S3 of the take-out chute 22, operates in a similar manner under the control of the control means.

As can be understood from the description above, the composite working device A can accomplish two operations, i.e. welding and transfer, using only a single robot, the two operations being conventionally accomplished by use of at least two robots. That is, the number of robots to be used for a given manufacturing step can be reduced and the space necessary for the manufacturing step is reduced.

Further since the welding-transferring robots 5 and 19 are arranged to hold the respective work holders by way of a first joint point 28 provided separately from the welding gun 27, unlike the method disclosed in Japanese Unexamined Patent Publication No. 58(1983)-151972 in which the workpiece is gripped by way of the electrode of the welding gun, the workpiece can be stably transferred without possibility of the electrode of the welding gun being damaged. Further because the size, shape and the like of the work holders (7, 21) can be freely selected, the composite working device can be applied to welding and transfer of any workpiece without limitation by size or shape of the workpiece. Further, because the work holder is removed from the robot on its way from one table for placing thereon a workpiece to the other table, the time requisite for removal of the work holder can be shortened.

Though the robot accomplishes welding as the regular operation thereof in the embodiment described above, the robot may accomplish another operation such as tightening of a bolt or coating as the regular operation.

The composite working device of the present invention may be applied to various field and is not being limited to assembly of vehicle bodies as described above.

I claim:
1. A composite working device comprising:
   (1) a robot including
      (a) a base;
      (b) a horizontal arm having a mounting portion and a free end portion;
      (c) means for rotatably and pivotally mounting the mounting portion of the horizontal arm with respect to the base so that the arm may be rotated between a first station and a second station and may be pivoted in at least a vertical plane where said first and second stations are each permanently fixed in position with respect to said base of the robot;
      (d) a working tool disposed at the free end portion of the horizontal arm for accomplishing a regular operation of the robot on a workpiece disposed on a work table fixed to at least one of said first and second stations where the regular operation is a processing operation and does not include transferring the workpiece;
      (e) a first joint member disposed at the free end portion of the horizontal arm outside the working space of the working tool;
      (f) control means for generating a regular operation command to cause the working tool of the robot to accomplish said regular operation on the workpiece at one of said first or second stations or for generating a transfer command to cause the robot to transfer the workpiece from the first station to the second station; and
   (2) a single work holder being positionable in a predetermined waiting position outside the working space of the working tool, said position being between the first and second stations and within the area traversed by the first joint member disposed at the free end of the horizontal arm whenever the arm is rotated between said first and second stations, the work holder including a second joint member and a clamp mechanism for gripping the workpiece, the work holder being positioned, while the working tool of the robot accomplishes its regular operation, in said predetermined waiting position, said first and second joint members being connected to or disconnected from each other at said waiting position so that said work holder can be moved to or from said waiting position as said free end portion of the arm is moved back and forth between the first and second stations.

2. A composite working device as defined in claim 1 in which said robot accomplishes the regular operation at said first station.

3. A composite working device as defined in claim 1 in which said robot accomplishes said regular operation at said second station.

4. A method of accomplishing composite work using a robot arm rotatably and pivotably mounted with respect to a base of the robot comprising a step of causing the robot arm to accomplish a regular operation on a workpiece by use of a working tool mounted on the robot arm where the regular operation is a processing operation, and a step of causing the robot arm to accomplish transfer of the workpiece from a first station to a second station where said first and second stations are each permanently fixed in position with respect to said base of the robot by causing the robot arm to connect a single work holder associated with the first and second stations to the robot arm by way of a first joint member provided on the robot arm outside a working space of the working tool and a second joint member provided on the work holder and to approach the workpiece so that the workpiece is held by the work holder, actuating a clamp mechanism of the work holder to grip the workpiece, and moving the robot arm from the first station to the second station together with the workpiece gripped by the clamp mechanism, the step of causing the robot arm to accomplish transfer of the workpiece being carried out in the intervals between operations of the step of causing the robot arm to accomplish the regular operation, the latter step being carried out at the first or second station, the method further comprising the steps of positioning the work holder at a predetermined waiting position, outside a working area where the robot arm accomplishes the regular operation on the workpiece and within a movable area of the robot arm, when the robot arm accomplishes the regular operation on the workpiece, and prior to the step of transferring the workpiece, moving the robot arm towards the predetermined position where the work holder is positioned so that the robot arm is attached to the work holder by connecting the first joint member to the second joint member, and after transferring the workpiece to the second station, returning the work holder back to the predetermined waiting position via the robot arm, and separating the first joint member from the second joint member thereby leaving the work holder in the predetermined waiting position.

5. A method of accomplishing composite work as defined in claim 4 in which said waiting position is disposed between said first and second stations along the path along which the robot moves to transfer the workpiece from the first station to the second station.

6. A composite working device comprising:
   (1) a robot including
      (a) a base;
      (b) a horizontal arm having a mounting portion and a free end portion;
      (c) means for rotatably and pivotally mounting the mounting portion of the horizontal arm with respect to the base so that the arm may be rotated between a first station and a second station and may be pivoted in at least a vertical plane where said first and second stations are each permanently fixed in position with respect to said base of the robot;
      (d) a welding gun disposed at the free end portion of the horizontal arm for accomplishing a welding operation of the gun on a workpiece disposed on a work table fixed to at least one of said first and second stations;

(e) a first joint member disposed at the free end portion of the horizontal arm outside the working space of the welding gun;

(f) control means for generating a welding operation command to cause the welding gun of the robot to accomplish said welding operation on the workpiece at one of said first or second stations or for generating a transfer command to cause the robot to transfer the workpiece from the first station to the second station; and (2) a single work holder being positionable in a predetermined waiting position outside the working space of the welding gun, said position being between the first and second stations and within the area traversed by the first joint member disposed at the free end of the horizontal arm whenever the arm is rotated between said first and second stations, the work holder including a second joint member and a clamp mechanism for gripping the workpiece, the work holder being positioned, while the welding gun of the robot accomplishes its regular operation, in said predetermined waiting position, said first and second joint members being connected to or disconnected from each other at said waiting position so that said work holder can be moved to or from said waiting position as said free end portion of the arm is moved back and forth between the first and second stations.

7. A composite working device is defined in claim 6, in which said robot accomplishes the welding operation at said first station.

8. A composite working device is defined in claim 6, in which said robot accomplishes the welding operation at said second station.

9. A method of accomplishing composite work using a robot arm rotatably and pivotally mounted with respect to a base of the robot comprising a step of causing the robot arm to accomplish a welding operation on a workpiece by use of a welding gun mounted on the robot arm, and a step of positioning a work holder in a predetermined waiting position, outside a working area where the robot arm accomplishes the welding operation on the workpiece and within a movable area of the robot arm, when the robot arm accomplishes the welding operation on the workpiece, and moving the robot arm towards the predetermined waiting position where the work holder is positioned to connect the work holder to the robot arm, and causing the robot arm to accomplish transfer of the workpiece from a first station to a second station where said first and second stations are each permanently fixed in position with respect to said base of the robot by the steps of causing the robot arm to connect a single work holder associated with each group of the first and second stations to the robot arm by way of a first joint member provided on the robot arm outside a working area of the welding gun and a second joint member provided on the work holder, and to approach the workpiece so that the workpiece is held by the work holder, actuating a clamp mechanism of the work holder to grip the workpiece, and moving the robot arm from the first station to the second station together with the workpiece gripped by the clamp mechanism, the step of causing the robot arm to accomplish transfer of the workpiece being carried out in the intervals between operations of the step of causing the robot arm to accomplish the welding operation, the latter step being carried out at the first or second station, and after the step of transferring the workpiece to the second station, bringing the work holder back to the predetermined waiting position, and separating the first joint member from the second joint member, thereby leaving the work holder in the predetermined waiting position.

10. A method of accomplishing composite work as defined in claim 9, in which said waiting position is disposed between said first and second stations along the path along which the robot moves to transfer the workpiece from the first station to the second station.

11. A method of performing an operation on a workpiece at at least a first station and then transferring the workpiece to a second station utilizing a composite working device including (1) a robot having (a) a base; (b) a horizontal arm having a mounting portion and a free end portion; (c) means for rotatably and pivotally mounting the mounting portion of the horizontal arm with respect to the base so that the arm may be rotated between said first station and said second station and may be pivoted in at least a vertical plane where said first and second stations are each permanently fixed in position with respect to said base of the robot; (d) a working tool disposed at the free end portion of the horizontal arm for accomplishing a regular operation of the robot on the workpiece where the workpiece is disposed on a work table fixed to at least one of said first and second stations and where the regular operation is a processing operation and does not include transferring the workpiece; (e) a first joint member disposed at the free end portion of the horizontal arm outside the working space of the working tool; (f) control means for generating a regular operation command to cause the working tool of the robot to accomplish said regular operation on the workpiece at one of said first or second stations or for generating a transfer command to cause the robot to transfer the workpiece from the first station to the second station; and (2) a single work holder being positionable in a predetermined waiting position outside the working space of the working tool, said position being between the first and second stations and within the area traversed by the first joint member disposed at the free end of the horizontal arm whenever the arm is rotated between said first and second stations, the work holder including a second joint member and a clamp mechanism for gripping the workpiece, the work holder being positioned, while the working tool of the robot accomplishes its regular operation, in said predetermined waiting position, said first and second joint members being adapted to be connected or disconnected to each other at said waiting position so that said work holder can be moved to or from said waiting position as said free end portion of the arm is moved back and forth between the first and second stations, said method comprising the following steps performed under the control of said command means:

(i) performing said regular operation on said workpiece at said first station;

(ii) rotating said horizontal arm to said waiting position and connecting the horizontal arm to the work holder via said first and second joint members;

(iii) rotating said horizontal arm with said work holder connected thereto back to said first station;

(iv) connecting said work holder to said workpiece via said clamp mechanism;

(v) rotating said horizontal arm with the work holder and workpiece connected thereto to said second station to thus effect transfer of the workpiece from the first to the second station;

(vi) releasing the workpiece from the work holder at said second station by releasing said clamping mechanism;

(vii) rotating said horizontal arm with said work holder connected thereto to said waiting position; and (viii) releasing said work holder from said horizontal arm by disengaging said first and second joint members.

12. A method as in claim 11 where said working tool is a welding gun.

13. A method as in claim 11 including step (ix) of positioning a further workpiece at said first station, (x) rotating said horizontal arm back to said first station and (xi) repeating said steps (i) through (viii) with respect to said further workpiece.

14. A method as in claim 12 where said working tool is a welding gun.

* * * * *